L. A. GRIFFIN.
EYE SHADE AND EYE PROTECTOR.
APPLICATION FILED APR. 23, 1917.
1,295,980.
Patented Mar. 4, 1919.
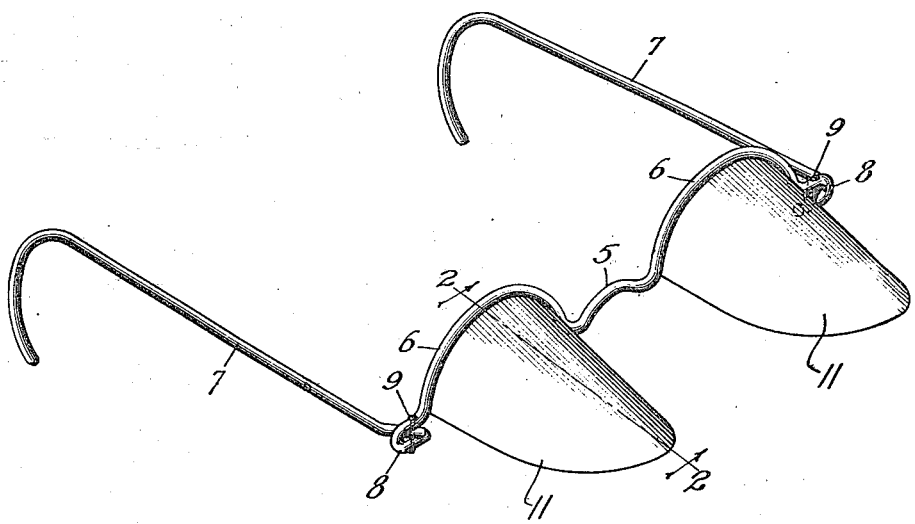
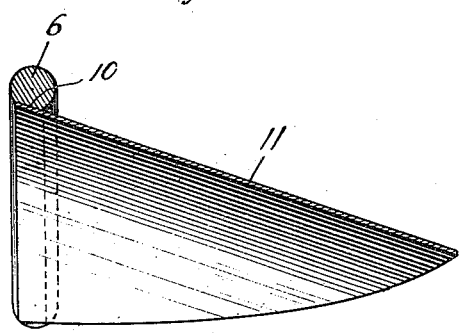
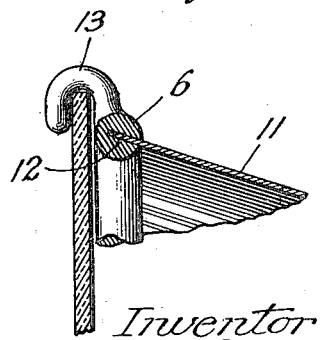
Witnesses:
Robert H. Weir
Arthur W. Carlson
Inventor
Lilyan A. Griffin
Benjamin, Roodhouse & Lundy
Attys.

UNITED STATES PATENT OFFICE.

LILYAN A. GRIFFIN, OF CHICAGO, ILLINOIS.

EYE-SHADE AND EYE-PROTECTOR.

1,295,980.

Specification of Letters Patent. Patented Mar. 4, 1919.

Application filed April 23, 1917. Serial No. 163,914.

*To all whom it may concern:*

Be it known that I, LILYAN A. GRIFFIN, a citizen of the United States, and a resident of the city of Chicago, county of Cook, and State of Illinois, have invented certain new and useful Improvements in Eye-Shades and Eye-Protectors, of which the following is a specification.

My invention relates to improvements in shades or protectors to be worn upon the head of a person for protecting the eyes from intense light and which also may be readily adjusted so as to exclude dust and other foreign material from the eyes and are especially adapted for persons engaged in or witnessing sports, motor drivers, and others.

A special feature of my present invention is that it may be employed either with or without spectacles or eyeglasses and employed in either manner will not introduce refraction or other optical phenomena to disturb the vision of the wearer or interfere with the correction supplied by the spectacles or eyeglasses.

One of the objects of my invention is the provision of an eye-shade or eye-protector that will afford the person wearing the same unobstructed vision in front of the eyes and at the same time protect the eyes from the more intense light rays from the sun or sky which usually reach the eye at an angle above the horizon or horizontal plane of the eye. Another object of my invention is the provision of a shade or protector that may be readily adjusted so that the eyes of the wearer will be protected from dust and wind. A still further object of my invention is the provision of an eye-shade or eye-protector that is transparent so that the wearer may, by a slight inclination of the head, direct his or her gaze through instead of under the shades or protectors, and thereby avoid the glare reaching the pupil of the eye and secure a substantial protection against dust and other foreign matter.

Further objects of my invention are the provision of an eye-shade or protector that is dependable in its operation, easy to wear, and simple in its construction so that it may be economically manufactured and sold or retailed at a small price.

I prefer to accomplish the divers objects of my invention by the means and in the manner hereinafter disclosed, reference being had to the accompanying drawings that form a part of this specification, in which,—

Figure 1 is a perspective view of an eye-shade or eye-protector made in accordance with the preferred form of my invention.

Fig. 2 is an exaggerated section thereof taken on line 2—2, of Fig. 1, and

Fig. 3 is a fragmental section illustrating a slightly modified construction especially for use in connection with spectacles and eye-glasses and illustrating another manner of securing the vizors to the bows.

In the drawings, the same reference characters have been employed to designate similar parts throughout the divers figures.

Referring more particularly to Figs. 1 and 2 of the drawings, it will be observed my invention preferably comprises a suitable frame for supporting a shade member in front of each eye of the wearer. Said frame preferably consists of a nose-piece or bridge 5, curved upwardly to fit comfortably upon the crest of the nose; and connected to opposite ends of the bridge, preferably integral therewith, are oppositely extended, correspondingly shaped arches or bows 6, that are substantially semicircular in shape so as to conform with the contour of the brows or upper portions of the eye-sockets. Suitable means are provided at the ends of these arches 6, whereby the adjacent ends of temple-pieces 7 are hingedly or pivotally mounted thereon. I have illustrated one form of convenient connecting means in Fig. 1 of the drawings, which consists in providing upon the outer ends of the bows, a substantially U-shaped extension 8, that is formed by bending the strip of material of which the bows are made back upon itself, and the adjacent ends of the temple-pieces are inserted between the parallel arms of said U-shaped extensions, after which suitable pintles 9 are provided through said arms and temple-pieces, thus permitting the latter to be folded flatwise against the arches in the manner usually employed in spectacle construction.

The under portions of the arches 6 are preferably flattened as shown in detail in Fig. 2 of the drawings, to provide suitable seats 10, for the forwardly extended shades or vizors 11 that are secured thereto by any suitable cementitious or adhesive material, or otherwise. These vizors, 11, are preferably made of transparent or semi-transparent material, such as celluloid, mica, or the like, and are preferably of an amber, green, blue or other neutral tone or color for the purpose of absorbing or neutralizing the actinic rays of light and preventing the same from reaching the eyes. The vizors having a curved form or arched section afford considerable protection to the sides as well as the top of the eyes, without interfering with direct vision.

If desired, the arches or bows 6 may be provided with grooves 12, into which the adjacent edges of the vizors 11 are inserted and secured, as illustrated in Fig. 3 of the drawing. In order that the shade may be readily attached to the spectacles or eyeglasses used by the person, I prefer to dispense with the temple-pieces 7 and hinge extensions 8, and provide each bow with an integral hook 13 adjacent the uppermost segment thereof, whereby the device may be mounted upon the lenses of the glasses, as shown in Fig. 3 of the drawings.

While I have herein illustrated and described certain specific means for carrying out my invention, it, of course, will be obvious to others skilled in this art, that the same is capable of modification and refinement. I therefore desire it understood that all such alterations or changes are contemplated as included within the scope of my invention as expressed in the appended claim.

What I claim as new is:—

An eye-shade comprising a frame consisting of a central bridge and integral arched bows extending in opposite directions from the ends thereof, and forwardly and downwardly projecting semi-transparent vizors of semi-circular cross-section the upper edges only whereof are secured to the said bows and which impinge against the eyebrows of the wearer and the outer and lower edges of said vizors being in an approximate horizontal plane with the pupil of the wearer's eyes whereby the wearer upon lowering his head is enabled to see through said vizors and which in normal position shade the eye sockets from the glare of light above the horizon.

Signed at Chicago, county of Cook and State of Illinois, this 14th day of April, 1917.

LILYAN A. GRIFFIN.

Witnesses:
GEORGE D. MADDOCK,
E. K. LUNDY, Jr.